3,035,889
Patented May 22, 1962

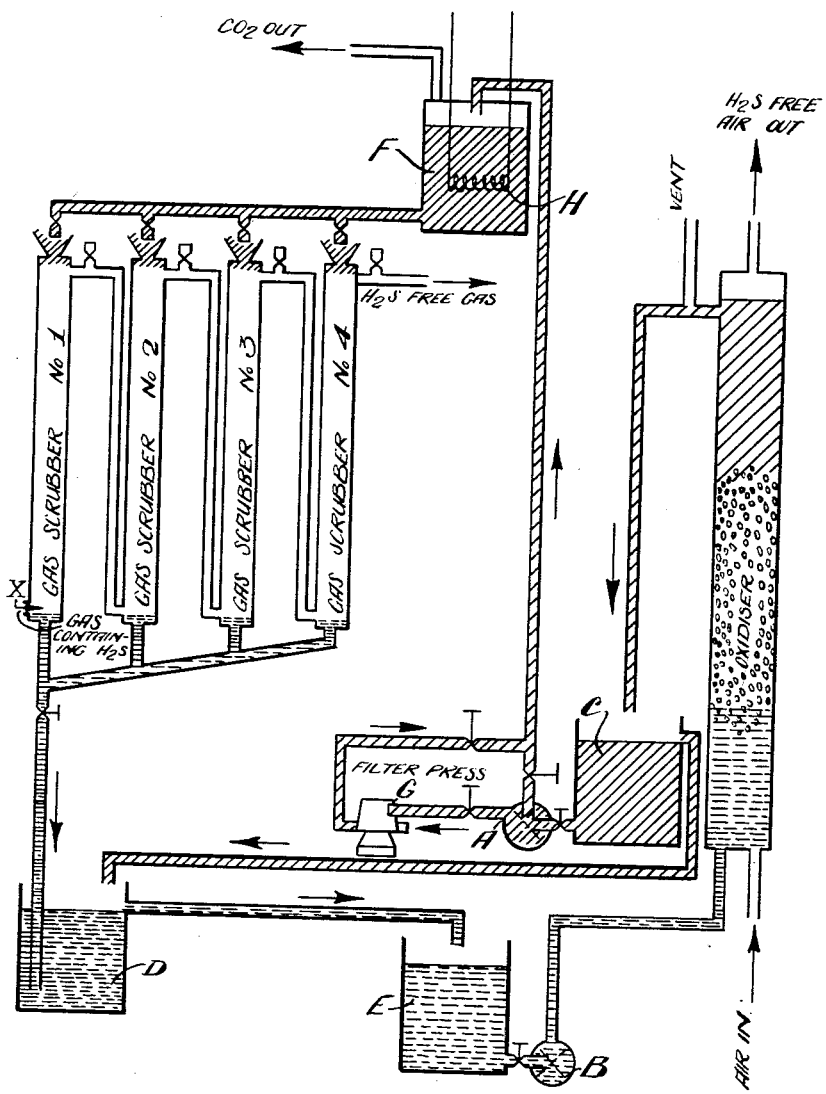

3,035,889
METHOD OF REMOVING HYDROGEN SULPHIDE FROM GASES AND PRODUCING SULPHUR THEREFROM
Thomas Nicklin, Davyhulme, Manchester, Anthony W. Sommerville, Whalley Range, Manchester, Ernest Brunner, Wilmslow, and Robert Isherwood, Sale, England, assignors to North Western Gas Board, Manchester, England, a British corporation, and The Clayton Aniline Company Limited, Manchester, England, a British company
Filed May 26, 1960, Ser. No. 31,904
Claims priority, application Great Britain Oct. 21, 1959
12 Claims. (Cl. 23—2)

This invention relates to the absorption and subsequent removal of hydrogen sulphide as sulphur. It is applicable to a gas consisting of hydrogen sulphide or gas mixtures, containing hydrogen sulphide in any proportion, in conjunction with other gases, such as carbon dioxide, carbon monoxide, hydrogen, aliphatic and aromatic hydrocarbons, organic sulphur compounds, oxygen and nitrogen.

According to the invention, the gas or gas mixture is washed with an aqueous alkaline solution of one or more anthraquinone disulphonic acids, whereby the hydrogen sulphide is oxidised and sulphur is liberated, and the reduced anthraquinone disulphonic acid or acids is or are reoxidised by means of free oxygen or a gas containing it.

All the known isomers of anthraquinone disulphonic acid are suitable for use in this process. These are:

Anthraquinone-1.5-disulphonic acid.
Anthraquinone-1.6-disulphonic acid.
Anthraquinone-1.7-disulphonic acid.
Anthraquinone-1.8-disulphonic acid.
Anthraquinone-2.6-disulphonic acid.
Anthraquinone-2.7-disulphonic acid.

Also mixtures of these isomers may be used with advantage, including commercially available mixtures which contain 1.5/1.8 or 2.6/2.7 anthraquinone disulphonic acids and possibly small quantities of other isomers.

The process may be carried out at normal or elevated temperatures, and at atmospheric or at higher pressures. When a carbon dioxide free gas is being treated, it is convenient to use normal temperature, but when carbon dioxide is present in the gas mixture it is advantageous to carry out at least a part of the process at a raised temperature as demonstrated in the examples.

The aqueous washing solution has a pH of above 7, the preferred value being from 8.5 to 9.5. The desired pH value and total alkali concentration may be obtained by adding alkalis such as caustic soda, caustic potash, ammonia or sodium, potassium or ammonium carbonate, or organic bases such as alkanolamines. When gases containing ammonia, e.g. coal gas, are being treated, the ammonia content of the gas may be sufficient to maintain the desired pH value.

The process may be operated batchwise, the aqueous alkaline solution being reacted with hydrogen sulphide or a mixture containing same until no further absorption of hydrogen sulphide occurs and depending on reaction conditions the whole or a part of the anthraquinone compound is wholly or partly reduced to the leuco state, after which the solution is regenerated with oxygen or a gas containing it. The precipitated sulphur may be removed either before or after the solution has been regenerated.

Usually, however, a continuous process is preferable. This may be carried out by any means suitable for bringing a gas into intimate contact with a liquid, for example by means of the well known scrubbing towers through which the gas flows upwards and the liquid passes downwards. Depending on the initial concentration of hydrogen sulphide and on the degree of removal required, it may be indicated to use one tower or preferably such a number of towers as to provide a certain margin of safety for preventing insufficient removal of hydrogen sulphide under adverse conditions.

If several scrubbing towers are used, the gas may pass through them in series, while the solution of anthraquinone disulphonic acid may be fed to the several towers, in parallel and in counter-current to the gas flow in each tower. The solution from the towers is passed through an oxidiser preferably in co-current with a stream of air, and is then returned to the scrubbing towers. Sulphur may be removed by filtration at a convenient point in the circulation, either before or after the regeneration of the solution. Where the gas contains carbon dioxide, the whole or a proportion of the circulating solution may be lead through a heating chamber where carbon dioxide is drawn off in order to avoid reduction of the pH value due to bicarbonate formation.

The process is applicable to coal gas, and like fuel gases, synthesis gases, natural gases, hydrocarbons in gaseous form, and gases consisting wholly or mainly of hydrogen sulphide.

The anthraquinone disulphonic acids and mixtures thereof have the following properties which render them particularly advantageous for the purposes of the present invention.

(1) They are stable compounds which undergo substantially no decomposition under the conditions of application, as for instance by the action of hydrogen peroxide in the presence of iron and alkali, and can be re-used indefinitely with little or no loss.

(2) They are non-toxic.

(3) They are soluble in water in both the oxidised and the reduced state.

(4) They are reasonable in cost.

(5) They have a speed of reaction in relation to both reduction and oxidation which is adequate to allow the process to be carried out economically. The ease of oxidation of the reduced anthraquinone disulphonic acids results in smaller air requirements with consequent appreciable saving in power consumption compared with other commercially operated wet processes.

(6) They do not show an undesired reaction with the normal constituents of the gas mixtures from which hydrogen sulphide requires.

The process enables coal gas to be economically purified to the statutory degree, and it enables sulphur to be recovered in a high state of purity and in a form suitable for technical application from gases containing or consisting of hydrogen sulphide The invention is illustrated by the following examples:

*Example 1*

A gas purification plant constructed mainly of mild steel, having six absorption bays filled with suitable packing through which the gas passes in series is supplied with 1,500,000 cu. ft. per day of crude coal gas containing ammonia and containing on an average 350 grams of hydrogen sulphide per 100 cu. ft. A washing liquor is passed through the bays in parallel, flowing in counter-current to the gas in each bay. The liquor consists of 20,000 gallons of water containing 0.5% by weight of a mixture of approximately equal parts of 2.6 and 2.7 anthraquinone disulphonic acids, which is initially made alkaline with concentrated ammonia liquor.

The liquor flows from the bays to a pumping tank, and in the bays and the tank, absorption of hydrogen sulphide followed by reduction of the anthraquinone disulphonic acids takes place. The liquor is then pumped to an oxidation vessel to which air is supplied for reoxidation. The oxidised liquor is returned to the absorption bays, the whole or a proportion being diverted through a filter press for the separation of sulphur and thence to the pumping tank.

The pH is maintained at a value of at least 8.8, and the gas leaving the last two absorption bays has a hydrogen sulphide content which is less than that required to comply with the Gas Referees Standard Test i.e. less than 2 parts per million.

*Example 2*

A gas washing apparatus is used as shown in the accompanying drawings. It consists of a number of towers in series so arranged that gas X fed in at the bottom of the towers is scrubbed by solution fed from a header tank F. The solution is run from the bottom of the towers to a storage tank D from whence it overflows to a second balancing tank E. From E the solution is pumped by means of pump B through an oxidising chamber where it is intimately mixed with air. The oxidised solution runs from the top of the oxidiser to a storage tank C from which it can be passed directly to header tank F for re-use or by-passed through a filtration unit G where suspended material can be removed before returning the solution to tank F for re-use. Tank F is fitted with a heating device H for heating the solution when an elevated reaction temperature is required. The apparatus is charged with a solution of composition per 100 parts by weight, 0.5 part of the disodium salt of anthraquinone 2.6 disulphonic acid 99.5 parts of water. The solution is adjusted to pH 8–9 by the addition of ammonium carbonate. Whilst the solution is circulating at room temperature through the system, a mixture containing, by volume, 50% hydrogen; 44% methane; 4% carbon monoxide; 1% oxygen and 1% hydrogen sulphide is passed through at such a rate that no hydrogen sulphide is detectable at the outlet of the final scrubber. All other gases pass the system unabsorbed.

*Example 3*

A washing solution, the composition per 100 parts by weight of which is 89.5 parts water
10 parts monoethanolamine
0.5 part of a commercial anthraquinone disulphonic acid mixture (58% 1.5-anthraquinone disulphonic acid, 29% 1.8-anthraquinone disulphonic acid, 2.4% 1.6 anthraquinone disulphonic acid and 10.6% 1.7 anthraquinone disulphonic acid) is supplied to an experimental apparatus as used in Example 2. The solution flows down the towers in parallel, and a synthetic gas, consisting of 60% hydrogen, 30% carbon dioxide, 5% nitrogen, 4% carbon monoxide and 1% hydrogen sulphide (by volume) is passed upwards through the towers in series. From the towers the solution flows to the oxidiser through which it passes concurrently with a stream of air, and then to the heating bath which is maintained at about 100° C. It is then returned to the scrubbing towers.

Hydrogen sulphide and carbon dioxide are removed by the solution, there being no trace of hydrogen sulphide (tested with lead acetate) at the outlet of the third scrubber. The anthraquinone disulphonic acid salts are reduced and sulphur is liberated and can be removed by diverting the whole or a portion of the solution through a filter, the clarified solution being returned to circuit.

In the heated bath, the absorbed carbon dioxide is driven off so that it can be recovered in a pure state, the decarbonated solution having been regenerated in the oxidiser.

The initial pH value of the solution is 11.0, but when the process is in operation this drops to pH 9.0 due to the formation of ethanolamine carbonate from which carbon dioxide can be expelled on heating.

*Example 4*

A gas washing apparatus substantially as described in Example 2 is charged with an aqueous solution containing per 100 parts by weight 0.5 part of a mixture in equal proportions of the disodium salts of 2.6 and 2.7 anthraquinone disulphonic acids, adjusted to pH 8–9 by addition of sodium carbonate.

The temperature of the solution is maintained above the decomposition temperature of sodium bicarbonate to sodium carbonate. A mixture of 90% carbon dioxide and 10% hydrogen sulphide (by volume) is passed through the apparatus at such a rate that no free hydrogen sulphide can be detected at the gas outlet. The use of a raised temperature prevents absorption of carbon dioxide and consequent reduction of pH value.

*Example 5*

A washing solution, the composition per 100 parts by weight being 0.5 part of approximately equal parts of 2.6 and 2.7 anthraquinone disulphonic acids with 1 part sodium carbonate and 98.5 parts water is used for scrubbing coal gas in a laboratory apparatus similar to that described in Example 2.

The process of hydrogen sulphide removal is carried out at room temperature, save that 5% of the circulating solution is diverted through a heating chamber kept at 60° C. between the reduction and reoxidation stages.

The passage of this portion of solution through the heating chamber expels sufficient carbon dioxide to prevent any drop in pH, the result being an automatic pH control.

*Example 6*

A washing solution, consisting of a 0.5% weight/volume aqueous solution of a mixture of approximately equal parts of 2.6 and 2.7 anthraquinone disulphonic acids, made alkaline with ammonia and containing 1% ammonium carbonate for pH adjustment, is fed to an experimental apparatus having a number of vertical glass scrubbers, packed with lengths of glass tube, the solution flowing down the scrubbers in parallel. Air containing 3% hydrogen sulphide is passed up the scrubbers in series, and the hydrogen sulphide is completely removed. A separate oxidiser is in this case unnecessary owing to the large proportion of oxygen present with the hydrogen sulphide. The solution leaving the scrubbers is returned to the tops of the scrubbers after filtering to remove precipitated sulphur.

What is claimed is:

1. A process for the absorption and subsequent removal as sulphur of hydrogen sulphide from gases in which the gas is washed with an aqueous alkaline solution of at least one anthraquinone disulphonic acid whereby the hydrogen sulphide is oxidised and sulphur is liberated, and the reduced anthraquinone disulphonic acid is reoxidised by means of a gas consisting at least in part of oxygen.

2. A process as claimed in claim 1, in which a solution of a mixture of isomeric anthraquinone disulphonic acids is used.

3. A process as claimed in claim 2 in which a solution of a mixture containing 2.6 and 2.7 anthraquione disulphonic acids is used.

4. A process as claimed in claim 2, in which a solution of a mixture containing 1.5 and 1.8 anthraquinone disulphonic acids is used.

5. A process as claimed in claim 1, in which the solution is brought to the desired pH value above 7 by the addition of a substance selected from the group consisting of alkalies and organic bases.

6. A process as claimed in claim 1, in which the gas being washed contains carbon dioxide and at least a part of the solution is heated for the purpose of driving off carbon dioxide absorbed from the gas being washed.

7. A process as claimed in claim 1, in which at least a part of the solution is passed through a filter for removing liberated sulphur.

8. A process as claimed in claim 1, in which the solution is circulated through gas scrubbers in parallel, the gas flowing through the scrubbers in series in countercurrent to the solution.

9. A process as claimed in claim 8, in which the solution is circulated also through an oxidiser, in which a gas consisting at least in part of oxygen flows in co-current with the solution.

10. A process as claimed in claim 1, in which ammonia contained in coal gas and like fuel gases is used to maintain the alkaline pH of the solution.

11. A process as claimed in claim 1, wherein at least a part of the material, of which the apparatus used for carrying out the process is constructed, and with which the solution comes into contact, comprises iron.

12. A process for the absorption and subsequent removal as sulphur of hydrogen sulphide from gases, comprising bringing the gas into intimate contact with an aqueous solution having a pH value above 7 and containing at least one anthraquinone disulphonic acid until the hydrogen sulphide has been oxidised, and subsequently bringing this solution into intimate contact with a gas consisting at least in part of oxygen, until the anthraquinone disulphonic acid which was reduced has been reoxidised.

References Cited in the file of this patent

UNITED STATES PATENTS

| | | |
|---|---|---|
| 2,819,950 | Patton | Jan. 14, 1958 |
| 2,911,438 | Szombathy | Nov. 3, 1959 |